United States Patent
Bisset

(10) Patent No.: US 8,611,514 B2
(45) Date of Patent: Dec. 17, 2013

(54) SYSTEMS AND METHODS FOR IDENTIFYING, DETERMINING, OR OTHERWISE VERIFYING THE TELEPHONE NUMBER OF FAX LINE

(75) Inventor: Douglas Bisset, Knebworth (GB)

(73) Assignee: Xerox Corporation, Norwalk, CT (US)

( * ) Notice: Subject to any disclaimer, the term of this patent is extended or adjusted under 35 U.S.C. 154(b) by 204 days.

(21) Appl. No.: 13/222,151

(22) Filed: Aug. 31, 2011

(65) Prior Publication Data

US 2013/0051540 A1   Feb. 28, 2013

(51) Int. Cl.
*H04M 11/00* (2006.01)

(52) U.S. Cl.
USPC .................. 379/100.12; 379/100.01

(58) Field of Classification Search
USPC ............ 379/100.12, 100.01, 93.07; 358/434, 358/440, 442
See application file for complete search history.

(56) References Cited

U.S. PATENT DOCUMENTS 7,436,941 B2 * 10/2008 Ohmori .................... 379/100.12

* cited by examiner

*Primary Examiner* — Stella Woo

(57) ABSTRACT

The present specification discloses systems and methods for verifying facsimile numbers associated with facsimile lines. The facsimile line may be provided in a standalone facsimile machine or may be part of a multi-function device. The present specification also discloses a routine for verifying and, if required, correcting an inaccurate telephone number displayed associated with a facsimile line. The verification may be performed automatically at predefined intervals or upon receiving a prompt from a user.

19 Claims, 7 Drawing Sheets

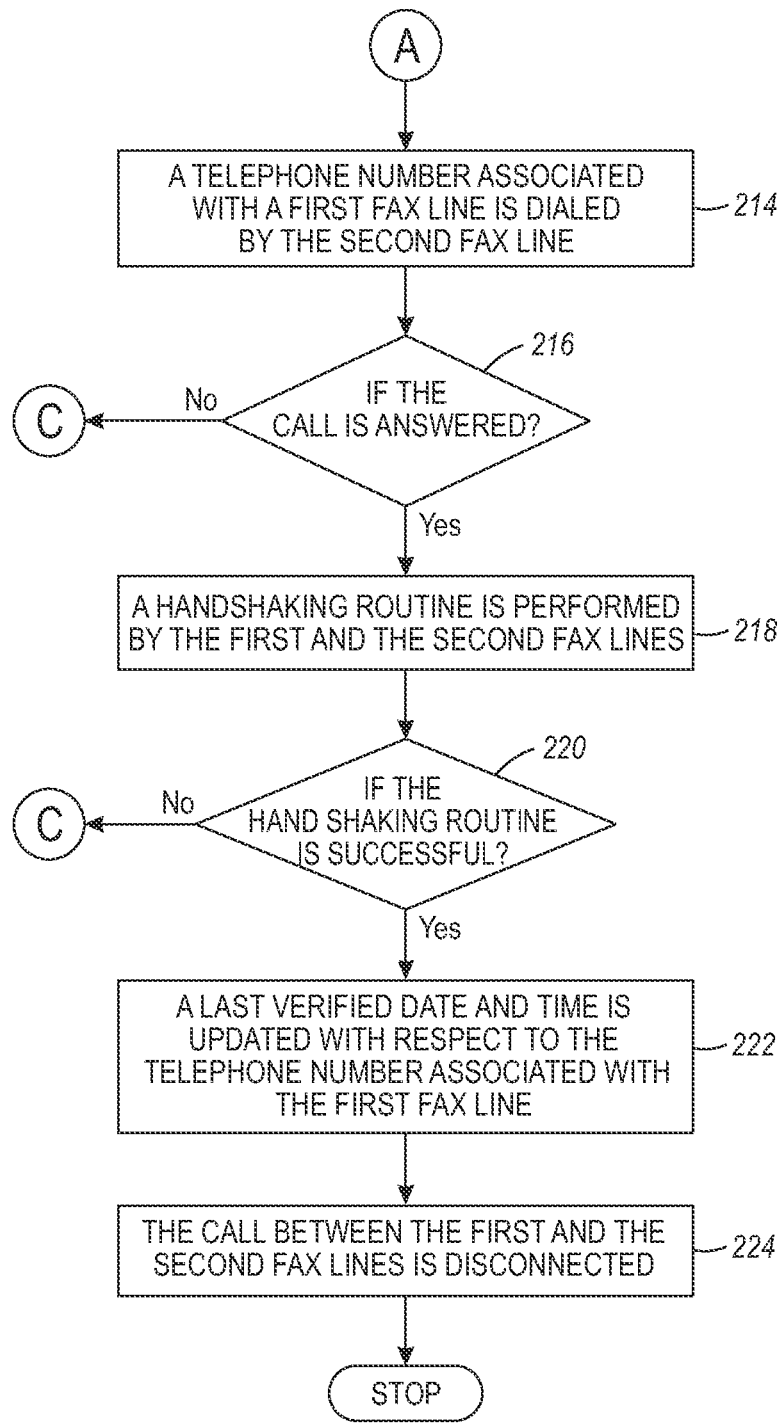
FIG. 2 (contd.)

SYSTEMS AND METHODS FOR IDENTIFYING, DETERMINING, OR OTHERWISE VERIFYING THE TELEPHONE NUMBER OF FAX LINE

FIELD OF THE INVENTION

The present specification discloses methods and systems for identifying, determining, or otherwise verifying a telephone number. More particularly, the present specification describes systems and methods for verifying at least one telephone number associated with a facsimile machine having one or more facsimile lines and/or resolving errors with respect to the same.

BACKGROUND

A Multi Function Device (MFD), as commonly known in the art, comprises a combination of one or more of devices, such as a printer, photocopier, scanner, and/or facsimile machine. Conventionally, a MFD has one or more facsimile lines incorporated therein, allowing for one or more facsimile messages to be sent or received simultaneously. Each facsimile line is associated with a telephone line over which facsimile messages are sent or received, and each telephone line is assigned a specific telephone number.

It may be noted that the word "facsimile", "system", or "fax machine" as used herein encompasses any apparatus or multi-function device which performs facsimile transmission functions, including but not limited to a standalone fax machine, a machine that combines printing, scanning, and/or faxing functionality, any computer executing software for faxing documents through a communication network, or any handheld device executing software for faxing documents through a communication network.

The telephone number associated with a facsimile line is configured into an MFD and is available for display in a 'General Information' screen. FIG. 1 illustrates an exemplary 'General Information' screen 100 displayed on a facsimile system. The screen 100 comprises a section 102 titled 'FAX Line ID's' for displaying the telephone number(s) 104 corresponding to the one or more facsimile lines present in the system. It should be appreciated that the term telephone number refers to any alphanumeric reference used to address a device connected to a telephone line, including seven digit numbers, area code plus seven digit numbers, or extension numbers.

In most cases, the number is entered into the MFD manually at the time of installation. The displayed number is prone to human errors, however. First, the manually inputted number may have been entered incorrectly at the time of installation. Second, the manually inputted number may not have been updated after a subsequent change in the telephone number associated with the telephone line to which the MFD is connected.

Because an erroneously displayed facsimile number may lead to further errors in the use of the MFD, there is need for methods and systems of verifying telephone numbers displayed as being associated with specific facsimile lines. There is also a need for being able to automatically correct invalid machine configuration information, such as inaccurate facsimile telephone numbers.

SUMMARY

In one embodiment, the specification discloses systems and methods for verifying facsimile numbers associated with facsimile lines. The facsimile line may be provided in a standalone facsimile machine or may be part of a MFD. In another embodiment, the present specification discloses a routine for verifying and, if required, correcting an inaccurate telephone number displayed associated with a facsimile line. The verification may be performed automatically at predefined intervals or upon receiving a prompt from a user.

In one embodiment, the specification discloses a computer readable medium storing a plurality of programmatic instructions adapted to be executed by a fax machine, having a first facsimile line and a second facsimile line, wherein said plurality of programmatic instructions comprise routines for causing said fax machine to place a first call from a second number associated with the second facsimile line to a first number associated with the first facsimile line; routines for storing a first set of data generated from said first call in a memory; routines for causing said fax machine to place a second call from the first number associated with the first facsimile line to the second number associated with the second facsimile line; and routines for storing a second set of data generated from said second call in a memory.

Optionally, the computer readable medium further comprises routines for generating an interface for displaying the first number associated with the first facsimile line and the second number associated with the second facsimile line. The computer readable medium further comprises routines for updating said interface based upon the first set of data generated from said first call and the second set of data generated from said second call. The update includes updating a time and date associated with when the first call is placed, verifying if said first number is accurate, and verifying if said second number is accurate. The computer readable medium further comprises routines for determining if the first call is successful. The first call is deemed successful if the first call is answered by the first facsimile line. Upon determining the first call is successful, at least one of a time of said first call, a date of said first call, or the first number is written into a memory. The computer readable medium further comprises routines for determining if the second call is successful. The second call is deemed successful if the second call is answered by the second facsimile line. Upon determining the second call is successful, at least one of a time of said second call, a date of said second call, or the second number is written into a memory.

In another embodiment, the present specification discloses a computer readable medium storing a plurality of programmatic instructions adapted to be executed by a fax machine, having a first facsimile line associated with a first number, wherein said plurality of programmatic instructions comprise routines for causing said fax machine to place a first call from said first facsimile line to a device associated with a phone number external to the fax machine; routines for determining if a second call from the phone number external to the fax machine is successfully received within a predefined period of time; and routines for storing a first set of data generated from said second call in a memory, wherein if said second call is successfully received by the fax machine within the predefined period of time, the first number is verified as being accurately associated with said first facsimile line.

Optionally, if said second call is not successfully received by the fax machine within the predefined period of time, the first number is not verified as being accurately associated with said first facsimile line. The device associated with the phone number external to the fax machine receives and stores the first number. The device uses the stored first number to place the second call. The predefined period of time is less than 10 minutes. The computer readable medium further comprises routines for generating an interface for displaying the first number associated with the first facsimile line. The computer readable medium further comprises routines for updating said interface based upon the first set of data generated from said second call. The update includes updating a time and date associated with when the second call is placed and verifying if said first number is accurate. The second call is deemed successful if the second call is answered by the first facsimile line.

These and other embodiments shall be further explained and described in the Detailed Description section with reference to the Drawings.

BRIEF DESCRIPTION OF THE DRAWINGS

These and other features and advantages will be appreciated as they become better understood by reference to the following Detailed Description when considered in connection with the accompanying drawings, wherein.

DETAILED DESCRIPTION

The present specification discloses multiple embodiments. The following disclosure is provided in order to enable a person having ordinary skill in the art to practice the claimed inventions. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present application is to be accorded the widest scope encompassing numerous alternatives, modifications and equivalents consistent with the principles and features disclosed. For purpose of clarity, details relating to technical material that are known in the technical fields related to the claimed embodiments have not been described in detail so as not to unnecessarily obscure the disclosure.

The present specification discloses systems and methods for verifying a telephone line number associated with a facsimile machine. In various embodiments, the present specification provides at least one verification routine for verifying a telephone number associated with a facsimile line. In various embodiments, the telephone number associated with a facsimile line is one that is configured with respect to a facsimile line in the facsimile machine. In cases where a facsimile machine is a part of a Multi Function Device (MFD) comprising a printer, a copier, and/or scanner, in addition to one or more facsimile lines, the verification routine provided by the present specification is integrated with the MFD. It should be appreciated that the methods disclosed herein are implemented using programmatic routines which are stored in one or more memory locations that are either local to or remote from the facsimile system and executed by one or more processors associated with the facsimile system. It should further be appreciated that, as used herein, the phrase 'facsimile line' can include any communication channel, in whole or in part digital or analog, wired or wireless, which can reasonably also be used for voice or other real-time communication.

In an embodiment, the verification routines of the present specification prevent the display of an erroneous or inaccurate facsimile number in a screen, such as a 'General Information' screen, in a facsimile system. In one embodiment, the verification method is implemented in a facsimile system having two fax lines provided therein. In another embodiment, the verification method is implemented in a facsimile system having one fax line provided therein by using an external number, such as a toll free telephone number, to validate the fax number contained within the facsimile system's configuration information.

Figure 1:
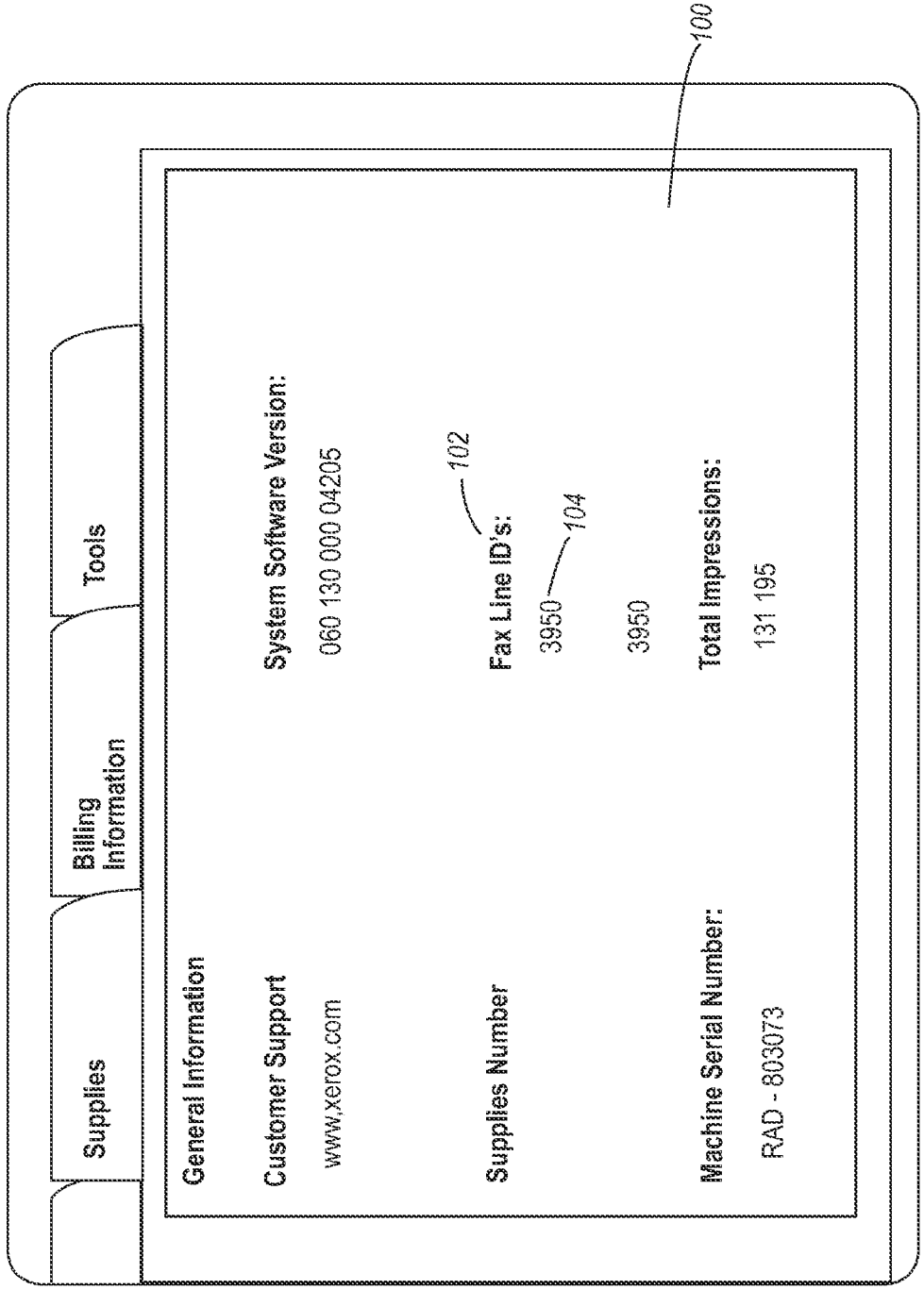
FIG. 1 illustrates an exemplary 'General Information' screen displayed in a facsimile system.
Figure 1A:
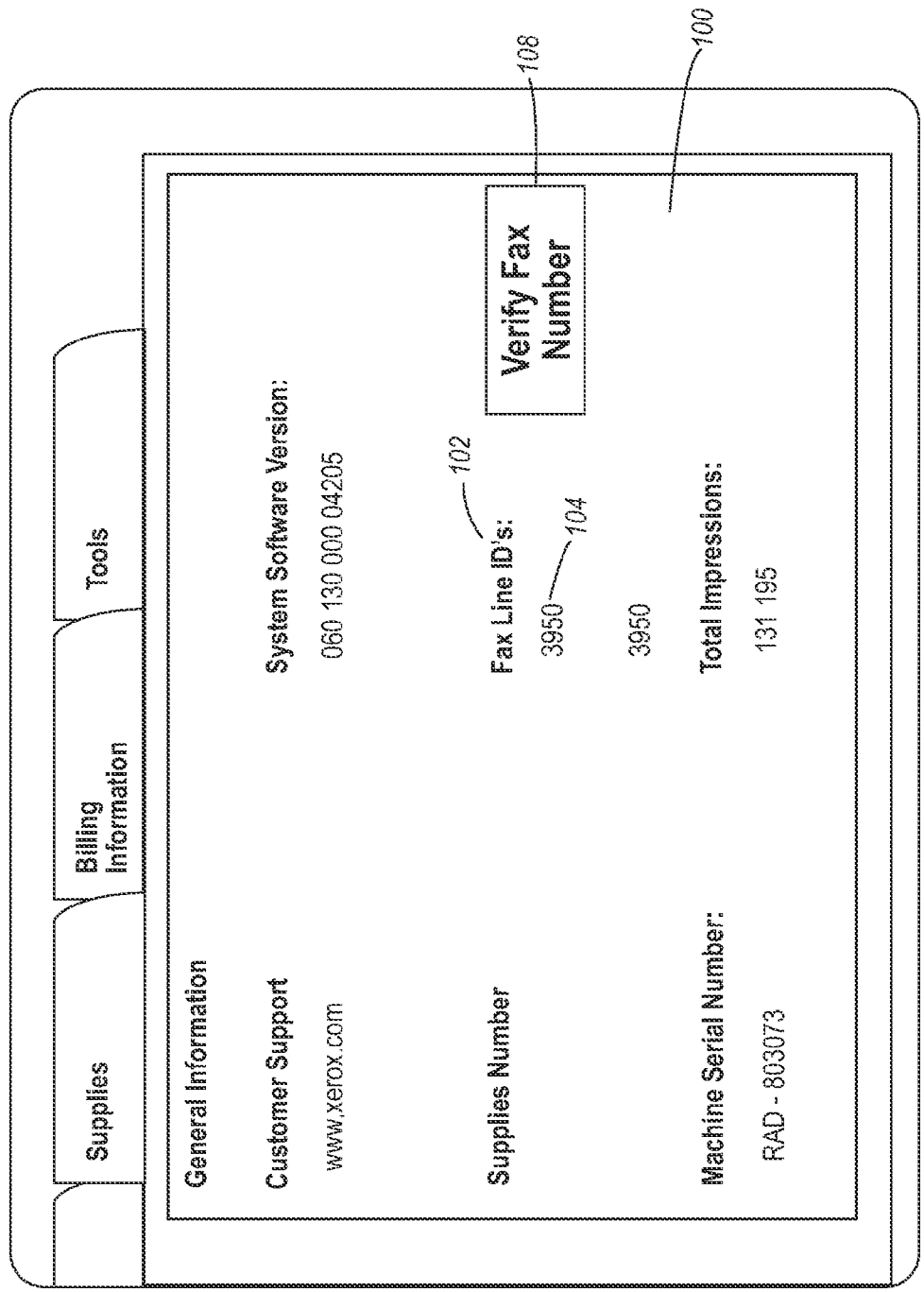
FIG. 1A illustrates an exemplary 'General Information' screen displayed in a facsimile system with a "Verify Fax Number" icon.

In an embodiment, a graphical icon, physical button, or other actuating mechanism is implemented within For example, referring to FIG. 1A, the verification method actuating mechanism may be a graphical icon entitled 'Verify Fax Number' 108, which is added to a user interface of a facsimile system 100. Once a user actuates the button 108, an automated routine is run in the facsimile system, which validates the displayed phone number 104, and if required, corrects the displayed number 104. The displayed phone number 104 is prone to human errors, may have been entered incorrectly at the time of installation, or may not have been updated after a subsequent change in the phone line associated with the facsimile system. Hence, the present specification provides methods for the automatic correction of invalid machine configuration information, specifically the facsimile number 104.

Figure 2:
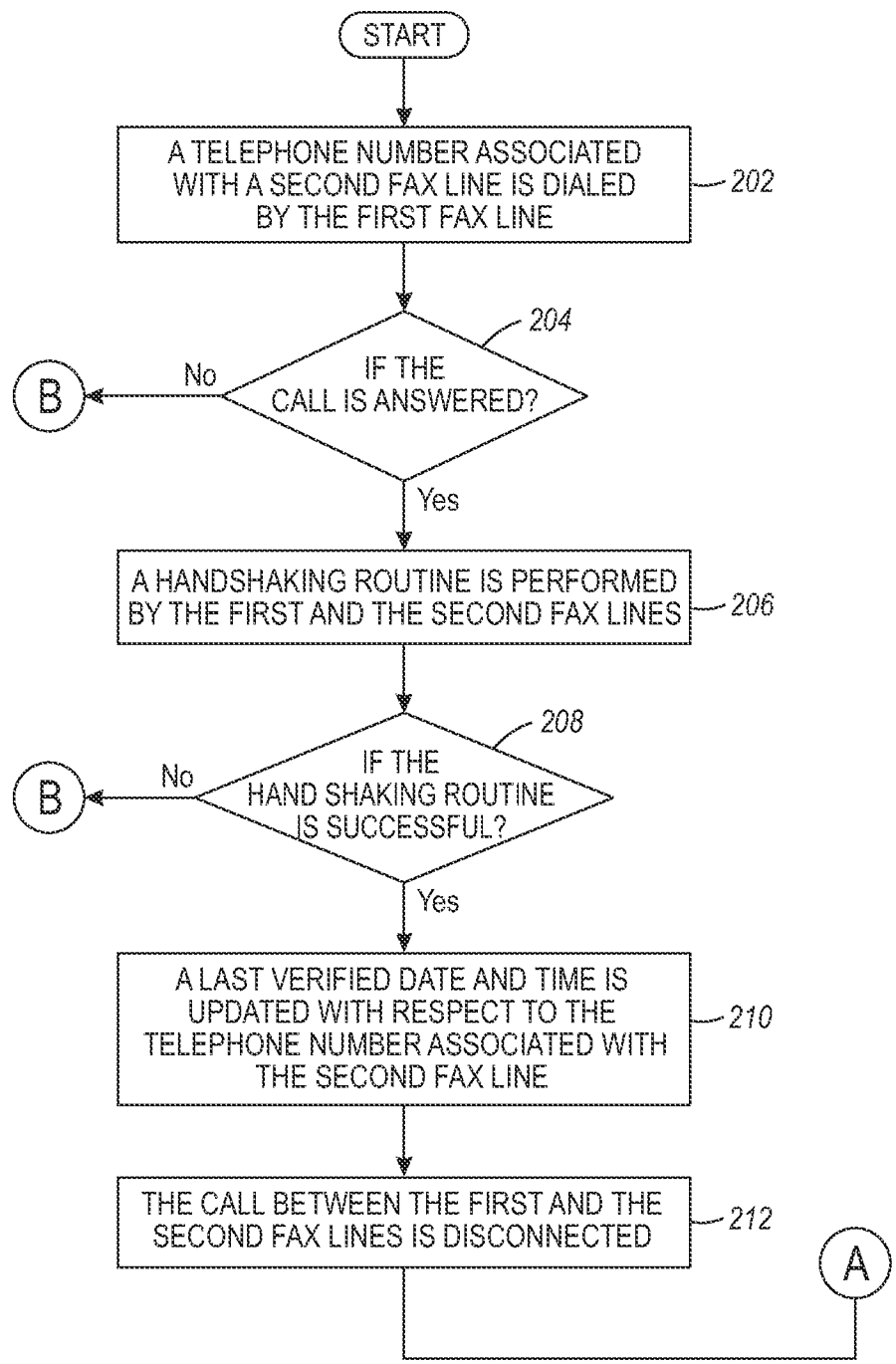
FIG. 2 is a flowchart illustrating a programmatic method for verifying telephone numbers associated with a fax machine comprising at least two fax lines, in accordance with one embodiment.

FIG. 2 is a flowchart illustrating an exemplary method for verifying telephone numbers associated with a fax machine comprising at least two fax lines. In one embodiment, the method is executed when a user selects an option to verify the telephone number(s) associated with a fax line. In another embodiment, the method is executed every time the facsimile line is initiated or whenever a fax is being sent or received using the fax line.

Figure 3:
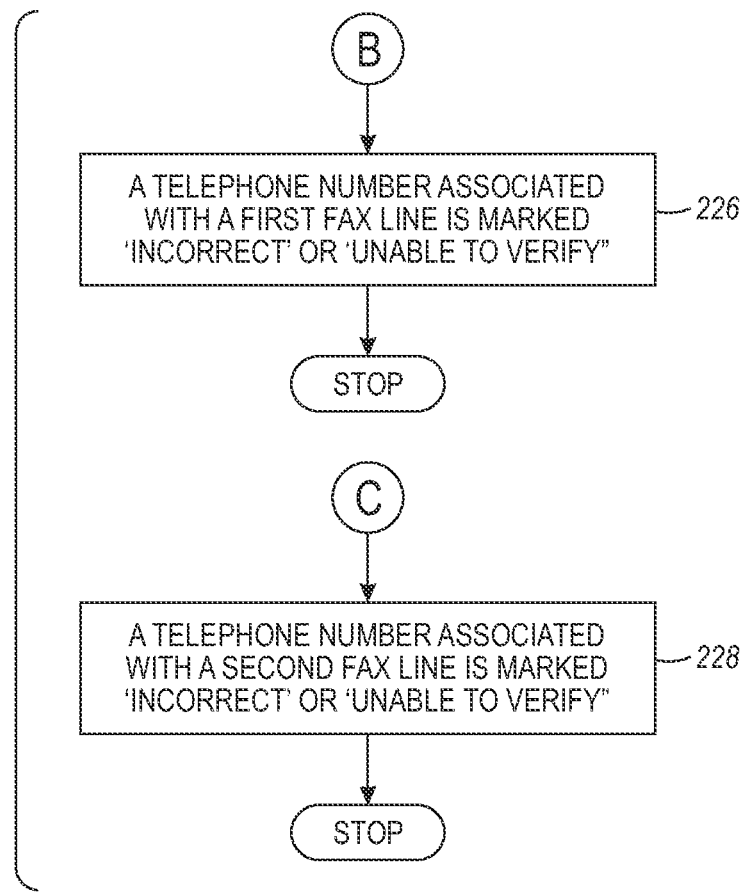
FIG. 3 illustrates an exemplary user interface (UI), which is used for activating the number verification method, in accordance with one embodiment.
Figure 3:
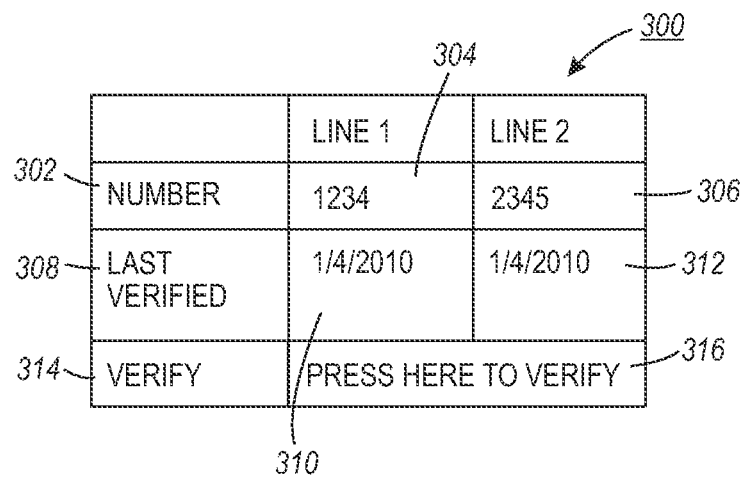

FIG. 3 illustrates an exemplary user interface (UI) 300, which is used for activating the number verification method. As illustrated, the user interface 300 comprises a row 302 for displaying a telephone number associated with a first and a second line in fields 304 and 306 respectively. Row 308 displays the most recent dates of verification of the telephone numbers associated with the first and the second lines in fields 310 and 312 respectively. Row 314 comprises a button 316 titled 'Press here to Verify', which when pressed invokes at least one of the telephone number verification methods disclosed herein.

Referring to FIG. 2, a telephone number associated with a second facsimile line is dialed 202 by the first facsimile line. The system determines 204 if the call placed by the first facsimile line is answered. If the call is answered, then a conventional handshaking routine 206 is performed by the first and the second facsimile lines to verify that the sending and receiving lines are from the same machine. The system determines if the handshaking routine was successful 208. If the handshaking routine was successful, then the system updates 210 within a local or remote memory a last verified date and time with respect to the telephone number associated with the second facsimile line. The first and the second facsimile lines are hung up 212, i.e. the call between the two lines is disconnected. This last verified date and time may then be displayed in a user interface, as shown in FIG. 3.

A telephone number associated with a first facsimile line is dialed 214 by the second facsimile line. The system determines 216 if the call placed by the first facsimile line is answered. If the call is answered, then a conventional handshaking routine is performed 218 by the first and the second facsimile lines to verify that the sending and receiving lines are from the same machine. The system determines 220 if the handshaking routine was successful. If the handshaking routine was successful, the system updates 222 within a local or remote memory a last verified date and time with respect to the telephone number associated with the first facsimile line. The first and the second facsimile lines are hung up 224, i.e. the call between the two lines is disconnected. This last verified date and time may then be displayed in a user interface, as shown in FIG. 3.

If the system determines that the call placed by the second facsimile line is not answered 204, determines that the first handshaking routine 208 was not successful, determines that the call placed by the first facsimile line is not answered 216, or determines that the second handshaking routine 220 was not successful, the system updates 226, 228 within a local or remote memory a last verified date and time with respect to the telephone number associated with the first facsimile or second facsimile line. In particular, the value associated with the last verified date and time may be stored, and then displayed, as 'incorrect' or 'unable to verify'.

The method illustrated in FIG. 2 enables a system to determine if one or both numbers associated with at least two facsimile lines in the system are incorrect. In one embodiment, where more than two facsimile lines are present in a fax system, the phone number verification method can be performed by extending the method illustrated in FIG. 2 to more than two lines. For example, where there are three lines, the third line may be used to verify the first and second lines and either the first or second lines may be used to verify the third line. Additionally, where an initial verification attempt may be unsuccessful, the system may then repeat the verification process using a second line. For example, where there are three lines and the third line has failed to successfully verify the accuracy of the first fax line, then the system may use the second fax line to verify the accuracy of the first fax line as a backup method.

In another embodiment, a predefined phone number, external to the system, may be used to verify the numbers associated with two or more facsimile lines present in a system. This method further helps establish which number is displayed incorrectly, and enables a customer to be better informed with a reduced level of support calls. The use of an external phone number is further discussed in the context of a facsimile system with only one facsimile line.

Figure 4:
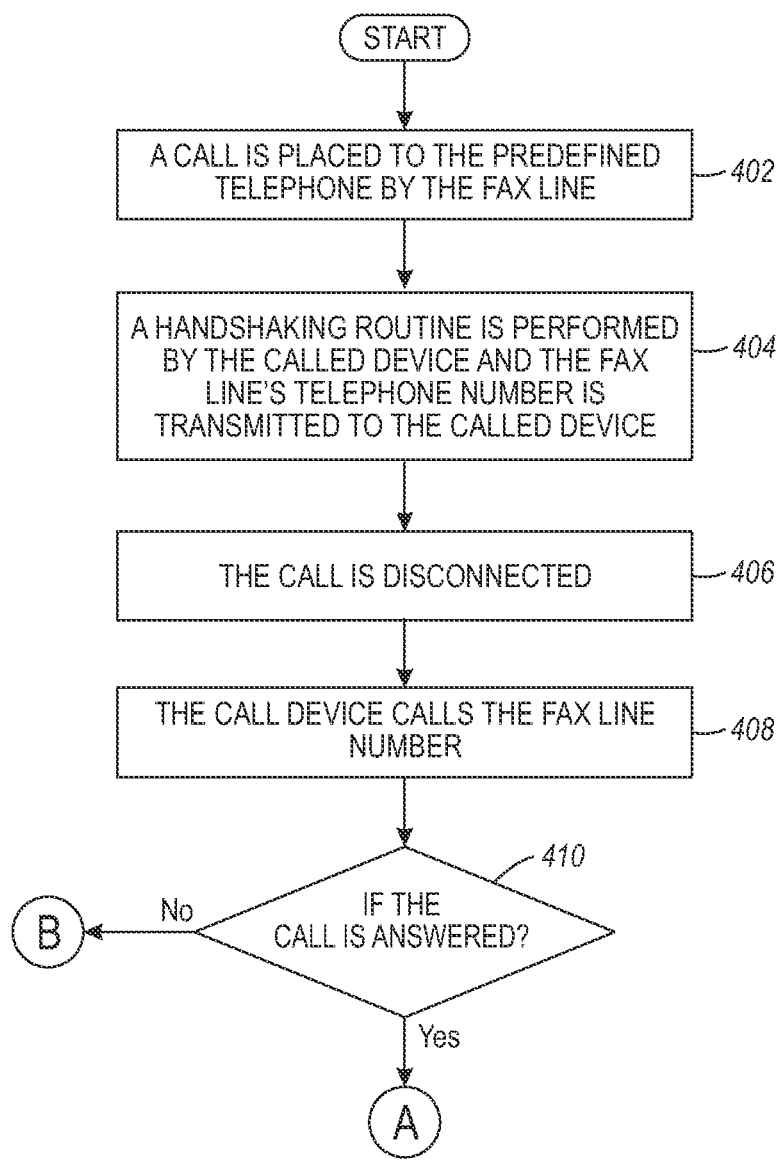
FIG. 4 is a flowchart illustrating a routine for verifying a telephone number associated with a facsimile machine, in accordance with one embodiment.

Referring to FIG. 4, a method for verifying a telephone number associated with a facsimile machine is shown where the fax system comprises a single facsimile line. In this embodiment, a predefined telephone number, external to the fax system, is used to verify the telephone number associated with the facsimile line. In an embodiment, the method illustrated in FIG. 4 is executed when a user selects an option to verify the telephone number associated with a facsimile line.

In another embodiment, the method is executed every time the facsimile line is initiated or whenever a fax is being sent or received using the fax line.

Figure 4A:
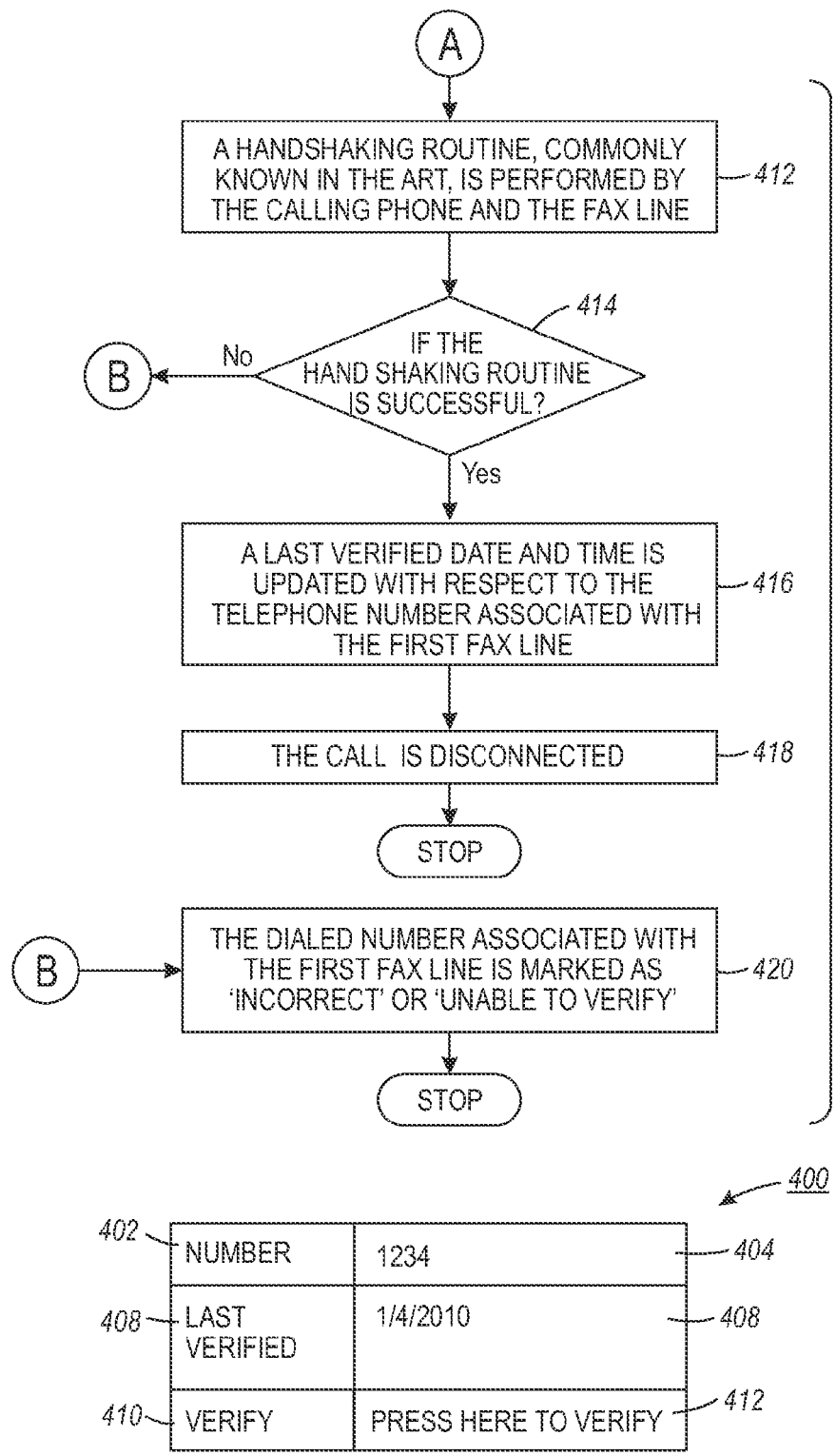
FIG. 4A illustrates an exemplary user interface (UI), which is used for activating the number verification method, in accordance with one embodiment.

FIG. 4A illustrates an exemplary user interface (UI) 400, which is used for activating the number verification method. As illustrated, the user interface 400 comprises a row 402 for displaying a telephone number associated with a first fax line in field 404. Row 406 displays the most recent date of verification of the telephone number associated with the fax line in field 404. Row 410 comprises a button 412 entitled 'Press here to Verify', which when pressed invokes at least one of the telephone number verification methods disclosed herein.

The method illustrated in FIG. 4 may be executed by a fax system having at least one facsimile line to verify the telephone number associated with the facsimile line. When a user activates the number verification routine of the present specification, the system places a call 402 to a predefined telephone number, which is external to the system, by the fax line. When the call is connected, a handshaking routine, commonly known in the art, is performed 404 by the device associated with the called telephone number, such as a computer, telephone, server, voice over IP server, or other call receiving apparatus, and the fax system.

The pre-configured number, which is associated with the telephone number of the facsimile line, is transmitted 404 to the called device and stored locally therein. The call is disconnected 406. The called device then calls 408 the fax system using the pre-configured number which was transmitted to, and stored by, the device associated with the predefined, external telephone number. The system determines 410 if the call is answered within a predefined period of time, such as less than twenty minutes, less than ten minutes, and preferably less than five minutes.

If the call is answered within the predefined period of time, a handshaking routine, commonly known in the art, is performed 412 by the calling device and the facsimile system. If the system determines 414 that the handshaking routine was successful, then the system updates 416 a last verified date and time with respect to the telephone number associated with the fax line. The call is then disconnected 418. If the system determines that a call is not received from the predefined external phone number within a predefined period of time or that the handshaking routine was not successful, the system updates 420, within a local or remote memory a last verified date and time with respect to the telephone number associated with the facsimile line. In particular, the value associated with the last verified date and time may be stored, and then displayed, as 'incorrect' or 'unable to verify'.

In summary, the present specification discloses methods and systems for verifying and correcting a telephone number corresponding to one or more facsimile lines in a fax system. The disclosed embodiments can be readily applied to all types of fax machines and it will be appreciated that various above-disclosed embodiments, other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

I claim:

1. A non-transitory computer readable medium storing a plurality of programmatic instructions adapted to be executed by a fax machine, having a first facsimile line and a second facsimile line, wherein said plurality of programmatic instructions comprise:

Routines for causing said fax machine to place a first call from a second number associated with the second facsimile line to a first number associated with the first facsimile line;

Routines for storing a first set of data generated from said first call in a memory;

Routines for causing said fax machine to place a second call from the first number associated with the first facsimile line to the second number associated with the second facsimile line; and Routines for storing a second set of data generated from said second call in a memory.

2. The non-transitory computer readable medium of claim 1 further comprising routines for generating an interface for displaying the first number associated with the first facsimile line and the second number associated with the second facsimile line.

3. The non-transitory computer readable medium of claim 2 further comprising routines for updating said interface based upon the first set of data generated from said first call and the second set of data generated from said second call.

4. The non-transitory computer readable medium of claim 3 wherein the update includes updating a time and date associated with when the first call is placed, verifying if said first number is accurate, and verifying if said second number is accurate.

5. The non-transitory computer readable medium of claim 1 further comprising routines for determining if the first call is successful.

6. The non-transitory computer readable medium of claim 5 wherein the first call is deemed successful if the first call is answered by the first facsimile line.

7. The non-transitory computer readable medium of claim 6 wherein, upon determining the first call is successful, at least one of a time of said first call, a date of said first call, or the first number is written into a memory.

8. The non-transitory computer readable medium of claim 1 further comprising routines for determining if the second call is successful.

9. The non-transitory computer readable medium of claim 8 wherein the second call is deemed successful if the second call is answered by the second facsimile line.

10. The non-transitory computer readable medium of claim 9 wherein, upon determining the second call is successful, at least one of a time of said second call, a date of said second call, or the second number is written into a memory.

11. A non-transitory computer readable medium storing a plurality of programmatic instructions adapted to be executed by a fax machine, having a first facsimile line associated with a first number, wherein said plurality of programmatic instructions comprise:

Routines for causing said fax machine to place a first call from said first facsimile line to a device associated with a phone number external to the fax machine;

Routines for determining if a second call from the phone number external to the fax machine is successfully received within a predefined period of time; and Routines for storing a first set of data generated from said second call in a memory, wherein if said second call is successfully received by the fax machine within the predefined period of time, the first number is verified as being accurately associated with said first facsimile line.

12. The non-transitory computer readable medium of claim 11 wherein if said second call is not successfully received by the fax machine within the predefined period of time, the first number is not verified as being accurately associated with said first facsimile line.

13. The non-transitory computer readable medium of claim 11 wherein the device associated with the phone number external to the fax machine receives and stores the first number.

14. The non-transitory computer readable medium of claim 13 wherein the device uses the stored first number to place the second call.

15. The non-transitory computer readable medium of claim 11 wherein said predefined period of time is less than 10 minutes.

16. The non-transitory computer readable medium of claim 11 further comprising routines for generating an interface for displaying the first number associated with the first facsimile line.

17. The non-transitory computer readable medium of claim 16 further comprising routines for updating said interface based upon the first set of data generated from said second call.

18. The non-transitory computer readable medium of claim 17 wherein the update includes updating a time and date associated with when the second call is placed and verifying if said first number is accurate.

19. The non-transitory computer readable medium of claim 11 wherein the second call is deemed successful if the second call is answered by the first facsimile line.

* * * * *